United States Patent [19]
DeNicola

[11] Patent Number: 5,666,538
[45] Date of Patent: Sep. 9, 1997

[54] DISK POWER MANAGER FOR NETWORK SERVERS

[75] Inventor: Richard M. DeNicola, Walnut, Calif.

[73] Assignee: AST Research, Inc., Irvine, Calif.

[21] Appl. No.: 475,567

[22] Filed: Jun. 7, 1995

[51] Int. Cl.⁶ .................................................. G06F 13/00
[52] U.S. Cl. .................. 395/750.03; 395/200.47; 364/707; 711/112
[58] Field of Search .................... 395/750; 364/707; 365/226–229; 324/103 R

[56] References Cited

U.S. PATENT DOCUMENTS

| | | | |
|---|---|---|---|
| 5,345,564 | 9/1994 | Jensen et al. | 395/275 |
| 5,483,468 | 1/1996 | Chen et al. | 364/551.01 |
| 5,517,649 | 5/1996 | McLean | 395/750 |
| 5,535,400 | 7/1996 | Belmont | 395/750 |
| 5,535,401 | 7/1996 | Rawson, III et al. | 395/750 |

*Primary Examiner*—Jack B. Harvey
*Assistant Examiner*—Jigar Pancholi
*Attorney, Agent, or Firm*—Knobbe, Martens, Olson & Bear, LLP

[57] ABSTRACT

A computer network includes a network server in communication with a plurality of user terminals. The network server includes disk drives which store data accessible via the user terminals. To increase power efficiency of the network server, the number of accesses to the disk drives is monitored and a histogram is generated to display the distribution of disk accesses over time. A network administrator subsequently selects time intervals to spin down one or more of the disk drives during periods of disk inactivity as depicted in the histogram. In a preferred embodiment, the network administrator uses the histogram for failure analysis to determine which disks are more likely to fail over long time periods.

13 Claims, 16 Drawing Sheets

| A Na | Edit Disk Name | aptor |

Name: VOL1:

Comment: DICK'S DATA DRIVE

SCSI ID: 1    Adapter: 1

FIG. 11D

Setup Miscellaneous Parameters

Directory:     SYS:\DPM

Purge after:   24 months

Sample Rate:   5 minutes

FIG. 11E

DISK POWER MANAGER FOR NETWORK SERVERS

BACKGROUND OF THE INVENTION

1. Field of the Invention

The present invention relates to power management within a computer system.

2. Description of the Related Art

Energy savings has become a key issue in many fields, including the computer industry. Most computer users and computer manufacturers have made efforts to increase power efficiency within computer systems to provide for a net energy savings that is beneficial both to the consumer, as a means of saving money on energy costs, and to the environment, by reducing overall energy consumption.

One common source of power inefficiency in computers is the energy used in maintaining rotation of disks within a hard disk drive while the computer is powered on and no accesses are being made to the disk drive. In certain applications, computer manufacturers have found it advantageous to manage the operation of the hard disk so as to obtain significant power savings.

For example, some desktop computers now include disk power management which causes a hard drive within the desktop computer to spin down when the computer has been inactive for some predetermined period of time. Certain desktop and laptop computer systems spin down the disk drive based upon previous monitoring of the user's habits. Thus, for instance, if previous monitoring of the user's habits indicates that when the user is away for more than five minutes the user typically does not return for a long time period, then the desktop or laptop computer will spin down the hard drive when a period of inactivity greater than five minutes is detected.

Although disk power management in desktop and notebook computer environments has been found to be straightforward in implementation, disk power management in network servers has met with several obstacles in the past. First, the entire network operating system is typically shut down whenever the network server is down. This makes the server unavailable to users who work late at night, or, if a company has an international business, employees in other countries would not have access to the network server in what would be daytime working hours to these international employees. Furthermore, with the network server powered down, tape backups of the network disk drives would be impossible.

A further reason for not powering down a server on a daily basis is that powering down the server would put undue thermal stress on the electronic components within the network server by heating and cooling them. This can cause the electronic components to fracture or come out of their sockets, causing a failure. This heating and cooling may also cause undue stress to circuit boards which have surface mount components. For these reasons, powering the entire server up and down on any regular basis would be impractical.

Furthermore, network servers, unlike notebook or desktop computers, include a network operating system which does not communicate with the disk drive controller through a standard interface BIOS (basic input/output system). Thus, what would be a straightforward implementation of a power management scheme to control the operation of spinning up and spinning down the disk drives in a notebook or desktop environment, is not straightforward for network servers.

This is, in part, because notebook or desktop computers are able to control the spinning up and spinning down of disk drives within the notebook or desktop computers via standard commands issued to the BIOS. But since the operating systems of network servers require a device driver application layer which is often custom designed for a given network operating system, a network server cannot simply spin up or spin down the disk drives within the network server using conventional commands without regard to the device driver used in accordance with the network operating system.

Finally, a typical mindset that servers are better left running continuously is still prevalent because disk drives in past servers were likely to not spin back up after being spun down. Thus, this mindset contributes to the reasons why disk drives in network servers are not spun down for purposes of power management.

SUMMARY OF THE INVENTION

A computer network which provides for increased power efficiency during selected time intervals comprises a plurality of user terminals and a network server in communication with the plurality of user terminals to transmit data to the user terminals and receive data from the user terminals. The network server comprises a processor which executes commands contained in a network operating system and an application module. The network server further includes a plurality of data storage disk drives in communication with the processor. The disk drives are spun-down to conserve power for predetermined intervals in response to commands issued by the application module in response to commands issued by the network operating system executed by the processor.

In a preferred embodiment, the application module comprises a device driver, and the network server further includes an input which receives instructions from a user to determine time intervals over which the disk drives are to be spun-down.

In a particularly preferred embodiment, the network server further comprises a monitoring module, executable by the processor, which monitors accesses to the disk drives to derive a statistical record therefrom, and a display terminal which displays data relating to the statistical record.

Another aspect of the present invention is a network server which provides for increased power efficiency during selected time intervals. The network server comprises a processor which executes commands contained in a network operating system and an application module; and a plurality of data storage disk drives in communication with the processor. The disk drives are spun-down to conserve power for predetermined intervals in response to commands issued by the application module in response to commands issued by the network operating system executed by the processor.

A further aspect of the present invention is a method of managing disk drive power within a network server having a processor which executes commands contained in a plurality of application modules and having a plurality of disk drives (disk drive subsystem) responsive to the commands executed by the processor. The method comprises the steps of loading a device driver application module to be executed by the processor; loading a monitoring application module to be executed by the processor; loading a console application module to be executed by the processor; monitoring accesses to the disk drives by the monitoring application module to generate a statistical record of the accesses to the disk drives; inputting data relating to spin-up and spin-down of the disk drives via the console application module based upon the statistical record of the accesses to the disk drives; and controlling spin-ups and spin-downs of the disk drives to reduce power consumption of the disk drives via commands executed by the processor to the device driver module based upon the input data.

In a preferred embodiment, the monitoring step monitors accesses to individual disk drives of the disk drive subsystem and the inputting step comprises inputting data relating to spin-up and spin-down of individual disk drives of the disk drive subsystem.

In a particularly preferred embodiment, the controlling step comprises controlling spin-up and spin-down of individual disk drives of the disk drive subsystem.

Another aspect of the present invention is a method of managing disk drive power within a network server having a processor which executes commands and having a plurality of disk drives responsive to the commands executed by the processor. The disk drives are accessible from a plurality of user terminals. The method comprises the steps of monitoring accesses to the disk drives; tabulating a number of accesses to the disk drives within a selected time interval to establish a statistical record; and controlling power supplied to the disk drives in response to commands executed by the processor based upon the statistical record.

In a preferred embodiment, the monitoring step monitors accesses to individual disk drives of the disk drive subsystem, and the controlling step comprises controlling power supplied to individual disk drives of the disk drive subsystem.

In a particularly preferred embodiment, the controlling step further comprises the steps of displaying information relating to the statistical record to a user; inputting control parameters for determining time intervals over which the disk drives are to be spun-down based upon the displayed information; and spinning-down the disk drives at the determined time intervals in response to the commands executed by the processor.

In still another preferred embodiment, the control parameters are selected to spin-down the disk drives during periods when the disk drives are statistically less likely to be accessed.

Another aspect of the present invention is a method of managing disk drive power within a network server having a processor which executes commands and having a plurality of disk drives responsive to the commands executed by the processor. The disk drives are accessible from a plurality of user terminals. The method comprises the steps of inputting control parameters for use by the processor for determining time intervals over which the disk drives are to be spun-down; and spinning-down the disk drives at the determined time intervals in response to the commands executed by the processor.

Another aspect of the invention is a method of reducing wear on disk drives within a computer network. The method comprises the steps of monitoring accesses to the disk drives over time to produce a statistical record of accesses to the disk drives; generating a histogram based upon the statistical record; determining if any of the disk drives is being accessed significantly more frequently than others of the disk drives based upon the histogram; and, if a disk drive is accessed significantly more frequently than others of the disk drives, redistributing the data contained within the disk drive to other disk drives to assure that the disk drive is accessed less frequently.

BRIEF DESCRIPTION OF THE DRAWINGS

FIGS. 11A–11E illustrate a plurality of exemplary NOVELL NETWARE screen displays which are presented to a user in order to facilitate the user's selection of a disk power management routine.

DETAILED DESCRIPTION OF THE PREFERRED EMBODIMENTS

Figure 1:
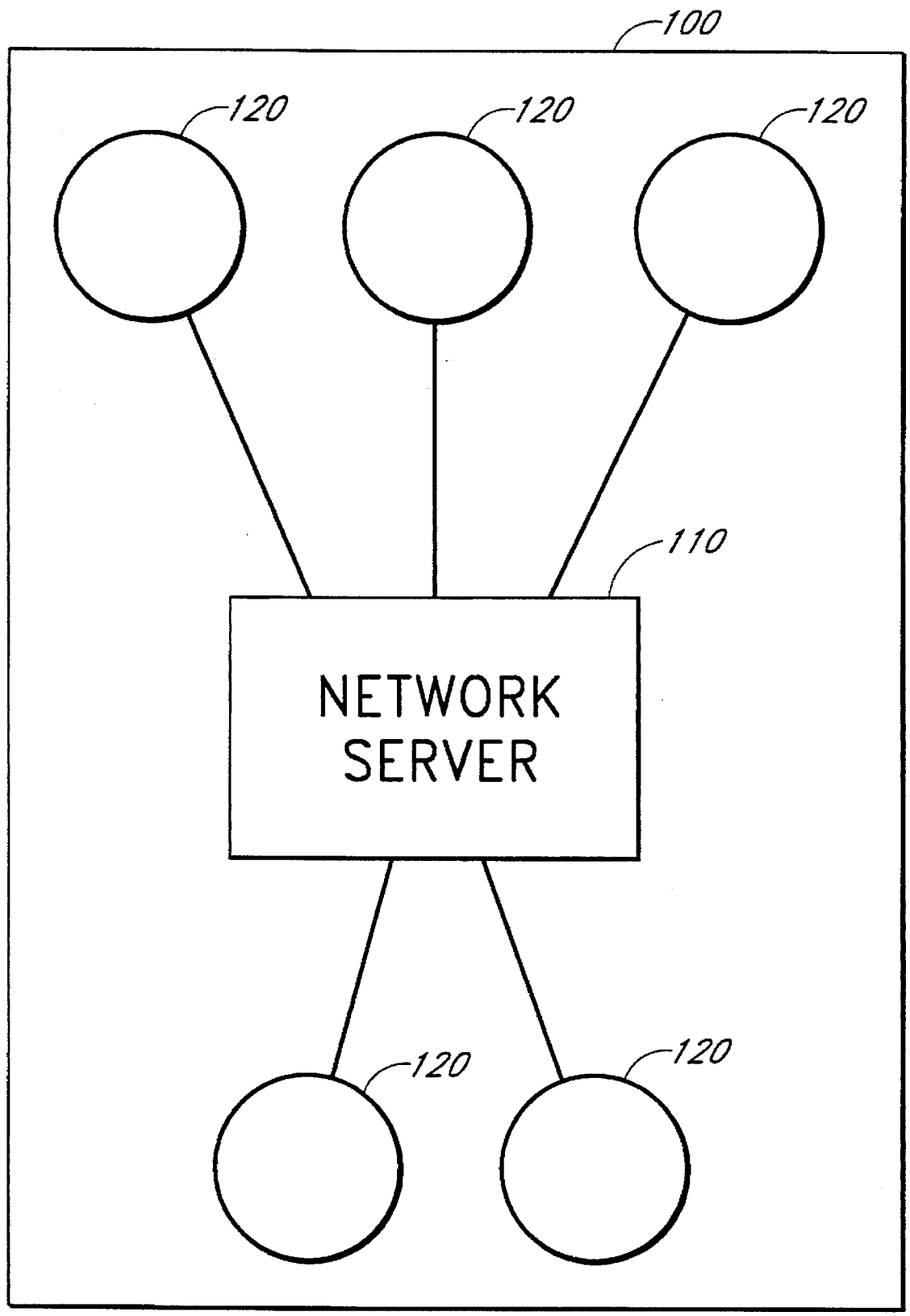
FIG. 1 is an overall system diagram showing a network server which is used to control and provide information to a plurality of user terminals.

FIG. 1 is an overall schematic block diagram of a multiple user computer network 100 including a network server 110 and a plurality of user terminals 120. In one preferred embodiment, the network server 110 comprises an AST MANHATTAN server including a storage subsystem (not shown in FIG. 1). Each of the user terminals 120 preferably comprises IBM compatible PCs, such as a 486 CPU-based BRAVO computer available from AST Research, Inc. Preferably, the network server 110 is capable of running NOVELL NETWARE, SCO Unix, MICROSOFT Windows/NT Server, or LAN MAN (IBM).

In general operation, the network server 110 manages data transactions between the network server 110 and the user terminals 120. As is well-known in the art, the network server 110 contains significant disk storage space having multiple data and resource files accessible by each of the user terminals 120 connected to the network server 110. Each user terminal 120 may, for example, be assigned a separate directory which includes data and resource files associated with that assigned terminal 120.

In accordance with the teachings of the present invention, the network server 110, which will be described in greater detail below with reference to FIG. 2, includes a disk power manager. The disk power manager provides for increased energy efficiency of the network server 110 by spinning down only the disk drives within the network server 110 for selected time intervals. As discussed above, significant advantages accrue when the disk drives of the network server 110 can be spun down during periods of inactivity. Specifically, energy savings are observed, and, furthermore, wear on the disk drive bearings is reduced to thereby extend the life of the individual disk drives which are spun down. By spinning down only the disk drives rather than powering down the entire network server 110, thermal stress on electronic circuitry within the network server 110 is avoided. In addition, risks involved in powering down the entire network server 110 and subsequently powering the network server 110 back up are obviated.

Of course, significant problems exist when attempting to implement a disk power manager within the network server 110. For example, because network servers typically handle multiple users having different working schedules, it is difficult to predict exactly when the disk drives within the network server 110 ought to be powered down and powered back up again. For example, if even one user accesses the network server 110 at regular intervals during what would normally be off-hours, spinning the disk drive down and up repeatedly could actually be detrimental to the system power savings and reliability of the disk drive. Furthermore such an implementation would be inconvenient for the user since typical spin-up time is on the order of 10-15 seconds, so that the user may experience significant delays in accessing data.

In addition to the difficulties observed when implementing disk power management where multiple users are concerned, implementation of disk power management within the network server also involves difficulties since the network operating system (e.g., NOVELL NETWARE, SCO Unix, MICROSOFT Windows/NT Server, etc.) does not directly control the operation of the disk drives.

In accordance with the teachings of the present invention, disk power management is implemented within the network server 110 by means of a customized device driver module which communicates with the network operating system. Furthermore, a preferred embodiment of the invention monitors disk drive activity and provides a histogram to a network administrator. This allows the network administrator to determine when the most effective power-down time intervals are observed by the network server. As will be discussed in greater detail below, these features of the present invention provide for a beneficial disk power manager within a network server environment.

Figure 2:
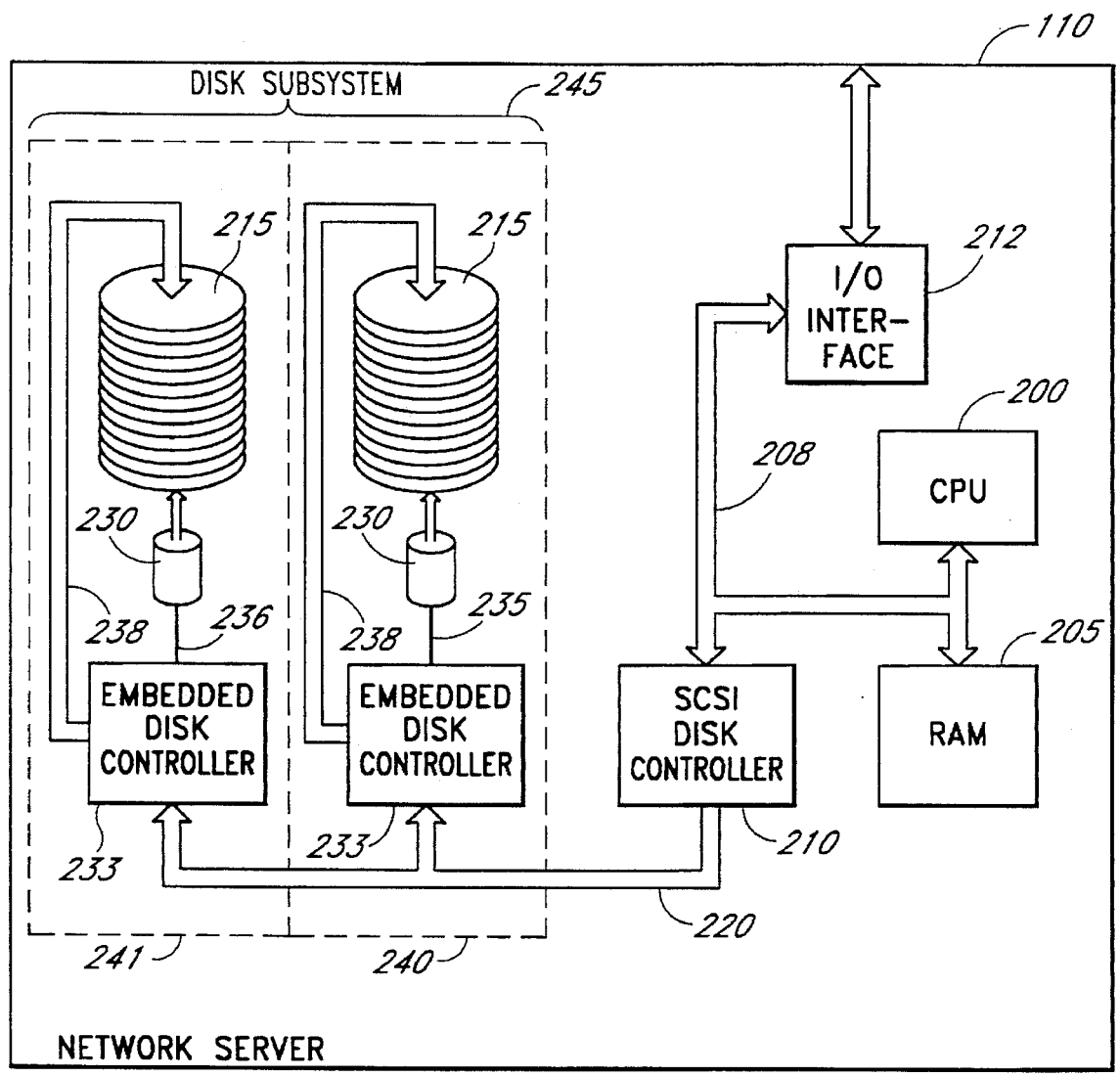
FIG. 2 is a schematic block diagram showing the main functional elements internal to the network server of FIG. 1.

FIG. 2 is a schematic block diagram showing the main structural and functional elements internal to the network server 110 of FIG. 1. As shown in FIG. 2, the network server 110 includes a CPU 200 which communicates with a random access memory (RAM) 205, a SCSI disk controller 210, an input/output (I/O) unit 212, and a disk subsystem 245 via a SCSI bus 220. It should be noted that the block diagram of FIG. 2 is simplified for purposes of clarity of illustration of the present invention. For example, in practice the server 110 may include multiple central processing units, multiple I/O units, etc. In one preferred embodiment, the CPU 200 comprises a Pentium processing chip available from Intel®, while the RAM 205 comprises 128 megabytes of RAM available from IBM. The I/O unit 212 may, for example, comprise a network interface card, or the like, for connecting the network server 110 with the plurality of user terminals 120 (FIG. 1). The Disk Subsystem 245 advantageously comprises a plurality of magnetic storage disk drives available from Quantum, Seagate Technologies, or the like, and, in one embodiment, provides a total disk storage capacity of 24 gigabytes.

A plurality of disk drive motors 230 are schematically depicted in FIG. 2 as well. The disk drive motors are typically included within each hard drive of the disk subsystem 245. An embedded disk controller 233 includes circuitry to power and control the disk drive motors 230. The disk drive motors 230 operate to spin the disk drives within the disk subsystem 245 up or down based on commands received by the embedded disk controller 233 from the SCSI disk controller 210 via control lines 235, 236.

In operation, the CPU 200 within the network server 110 issues commands to the other elements within the network server 110 via the data bus 208, and processes data received from the RAM 205 and the disk subsystem 245. The CPU 200 also manages the input and output of data to the user terminals 120 (FIG. 1) via the I/O interface unit 212. Data accesses are made to the disk drives 240 via the data line 238. During data accesses to the disk drive 240, the disks 215 are physically spinning under the control of the disk drive motors 230. As disks 215 spin, magnetic media rotates past a read/write head (not shown), which allows the read/write head to read data stored within the magnetic media in quick succession. When the network server 110 is shut down, the disk drives 240 are typically parked so that the disks 215 do not physically rotate. However, when the network server 110 is powered up, commands are issued to the disk drive motors 230, via the SCSI disk controller 210, to spin the disks 215 up again so that memory accesses to the disk drives 240 can be made from the system.

In network servers where the disks 215 are constantly spinning, and, particularly in those network servers which contain a large number of physical disk drives 240, a significant amount of power may be necessary to maintain the rotation of the disks 215 by the drive motors 230. Thus, if possible, it would be advantageous to increase energy efficiency by spinning the disk drives 240 down for periods where the disks 215 are not being accessed via the system. In accordance with the teachings of the present invention, the drive motors 230 are issued commands to spin down the disk drives 240 during determined time intervals so as to optimize power efficiency of the network server 110.

Figure 3:
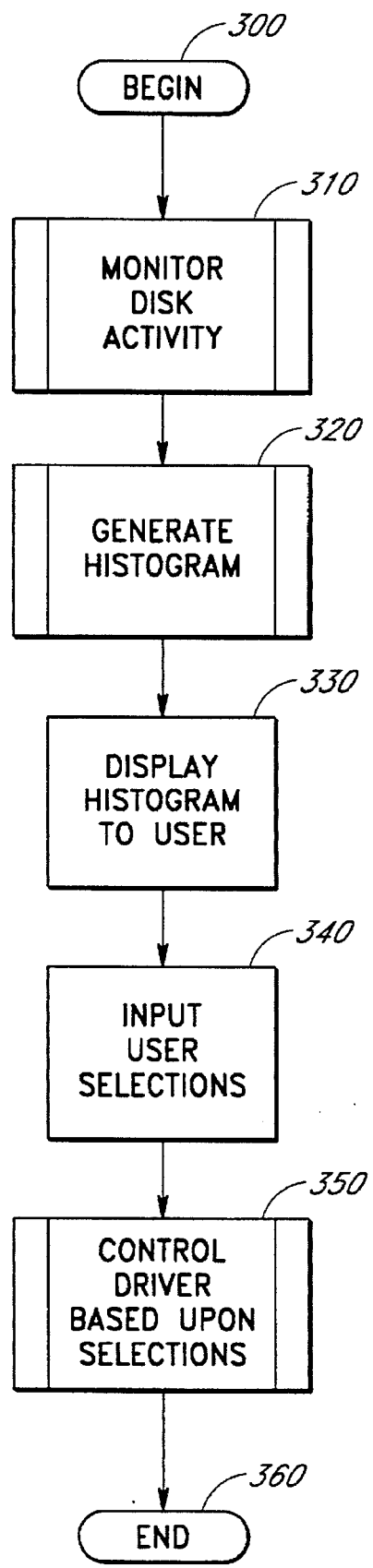
FIG. 3 is a flow chart which illustrates the general method employed in accordance with the present invention to manage disk power within the server of FIG. 1.

FIG. 3 is a flowchart which illustrates the overall method used in accordance with the present invention to manage the operation (i.e., the spinning up and spinning down) of the disk drives 240 within the network server 110. From an initial (BEGIN) block 300, control passes to a subroutine block 310, wherein the activity of the disk drives 240 is monitored under the control of software implemented within the CPU 200. Of course, it should be understood that, in a multiprocessor system, the monitoring software could be run on a time-shared basis by multiple CPUs. Accesses to the disk subsystem 245 are counted to determine the total number of accesses to the disk drives 240 within a given time interval. In one preferred embodiment, accesses to all of the disk drives 240 are counted to provide monitoring of the entire disk subsystem 245, while accesses to individual disk drives 240 within the disk subsystem 245 are also counted to provide for monitoring of each of the individual disk drives 240 within the disk subsystem 245. In this manner, a statistical record can be kept of the number of accesses to the entire disk subsystem 245, as well as to each of the individual disk drives 240 within the disk subsystem 245. The monitoring method used in the subroutine block 310 is described in greater detail below with reference to FIG. 4.

Based upon the statistical record, a histogram is generated as indicated within a subroutine block 320. That is, a bar graph which graphically illustrates the statistical distribution of accesses for the disk subsystem 245 over a determined time period is generated. For example, FIG. 6A depicts a histogram over a 24-hour period divided into 4-hour intervals. The number of disk accesses for each time interval is represented as a bar of varying lengths (i.e., longer bars represent a greater number of accesses within a given interval, and shorter bars for a lesser number of accesses within a given time period). The method used in accordance with one aspect of the present invention to generate the histogram will be discussed in greater detail below with reference to FIG. 5.

Once the histogram has been generated, the histogram is displayed to the user as indicated within an activity block 330. Again, FIG. 6A illustrates an exemplary histogram displayed to a network administrator for purposes of determining the activity of each of the disks within the disk subsystem 245 of the network server 110. Based upon the number of observed accesses to the entire disk subsystem 245, as well as the number of accesses to each of the individual disk drives 240 within the disk subsystem 245, the network administrator makes a determination as to when the several disk drives 240 within the disk subsystem 245 can be spun down for a significant interval of time without significantly impairing the performance of the network server 110. Thus, as shown in the example of FIG. 6A, the time intervals between midnight and 06:00 (6:00 a.m.), as well as the time period between 18:00 (6:00 p.m.) and midnight, observe insignificant disk accessing activity so that the network administrator may determine that it is beneficial to spin down the disk drives between 6:00 p.m. and 6:00 a.m. Of course, it should be understood that during this time interval, accesses may still be made to the disk subsystem 245 within the network server 110; however, such accesses, when initially made, may involve a delay time of 10 to 15 seconds while the disk drives within the disk drives subsystem 245 spin up to operating speed.

When the network administrator has determined the time intervals during which it will be beneficial to spin down the disk drives 240, the network administrator then inputs these selections (e.g., for each individual drive or for the entire disk subsystem 245), as indicated within an activity block 340. These inputs provided by the network administrator are used by the embedded disk controller 233 to control the disk drive motors 230 to cause the disk drive motors 230 to spin up or spin down the disk drives 240 at the selected times, as indicated within an activity block 350.

Control passes from the activity block 350 to a terminate (END) block 360, which completes the method of this aspect of the present invention to provide disk power management within the network server 110.

Figure 4:
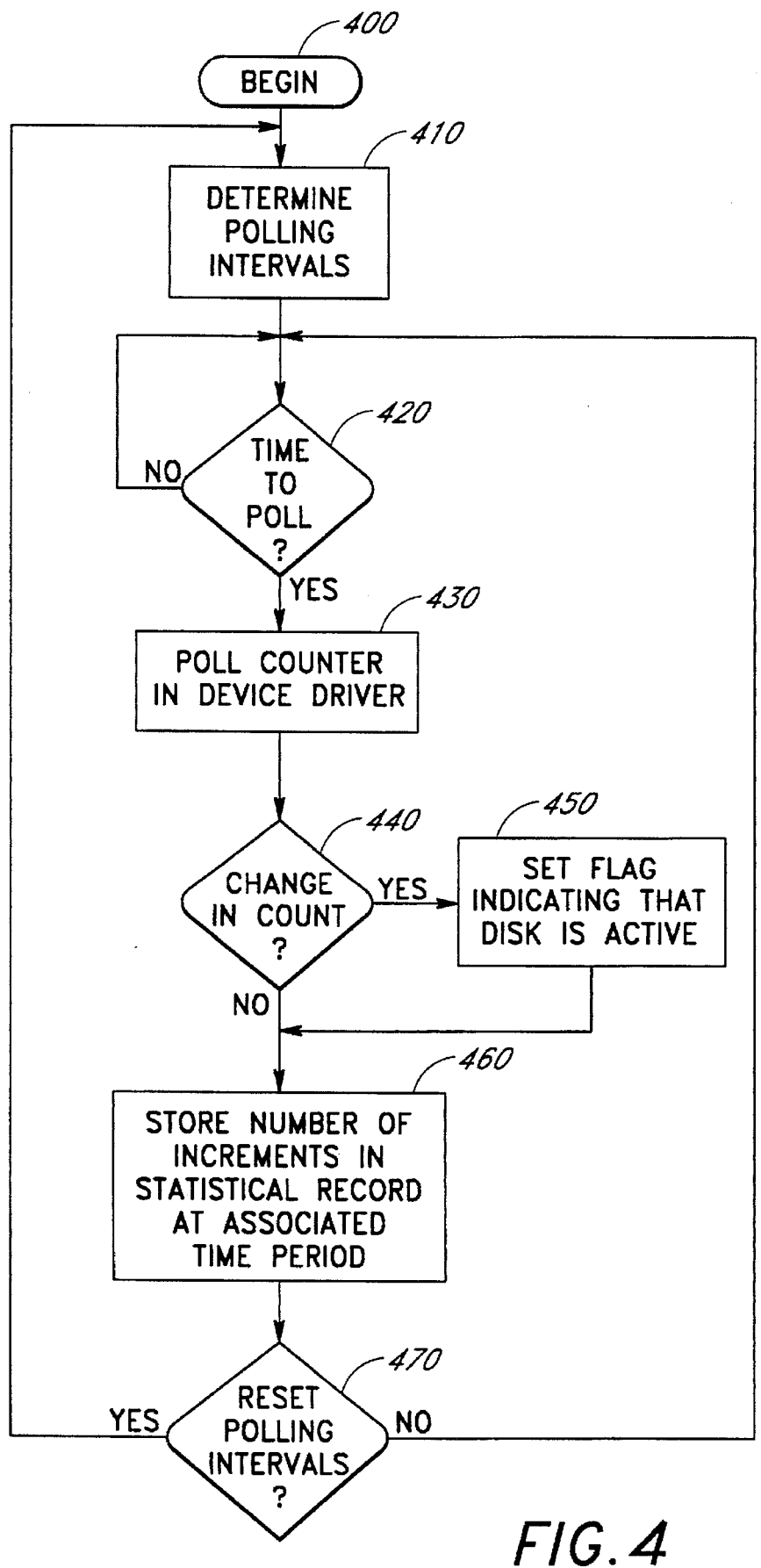
FIG. 4 is a flow chart which details the monitoring subroutine of FIG. 3 used by the server to monitor disk drive activity within the network server.

FIG. 4 is a flowchart which details the method used in accordance with the present invention to monitor the disk drive activities indicated within the subroutine block 310 of FIG. 3. The method of monitoring disk drive accesses initiates in a BEGIN block 400 and proceeds to determine the time intervals at which polling of the device driver is to take place, as indicated in an activity block 410. As will be discussed in greater detail below, the network administrator is requested to enter a polling interval (e.g., every 5 minutes) during set-up. Once a polling interval is determined, the disk monitor determines if it is time to poll the device driver (e.g., if a timer has expired) as indicated in a decision block 420. If the time to poll has not expired, then the disk monitor waits until it is time to poll the device driver, as indicated by the NO output branch of the decision block 420 returning to the input of the decision block 420. However, if it is determined within the decision block 420 that it is time to poll the device driver, the disk monitor polls the device driver to obtain the count value stored within read and write count registers within the device driver, as indicated in an activity block 430. The device driver includes two 32-bit registers corresponding to each disk drive. The registers are used to separately keep track of the number of read and write accesses made to the respective disk drives. That is, each counter is incremented upon the occurrence of a read or a write access. The values stored in these registers are written to a file, which is a statistical record, when the monitor polls the device driver.

Once the disk monitor has polled the device driver, a determination is made as to whether the count has changed within the read or write registers for each disk drive, as indicated within a decision block 440. This is done by subtracting the counter value from the previous poll from the current counter value and determining if the result is non-zero. It should be noted that, if the difference is negative, then this indicates a roll-over. In the case of a roll-over, the value obtained is post-processed to insure that the correct difference value (i.e.,the value which signifies the number of accesses to the disk drive) is obtained. If the current counter value is different than the previous counter value, then a flag is set to indicate that the disk drive is active, as indicated within an activity block 450. The absence of a disk active flag may be used, for example, to indicate when the disk drive has been inactive for a certain period of time so that the disk drive can be spun-down. The method subsequently proceeds to an activity block 460. If, within the decision block 440, it is determined that there is no change in the counter values, then the method passes immediately to the activity block 460.

As indicated within the activity block 460, the disk monitor stores the number of disk accesses in a statistical record. If there are no disk accesses in this time interval then a value of zero is stored in the statistical record. The statistical record groups the stored number of accesses based upon the polling interval over which the accesses were made. For example, the statistical record may include a field from 10:00 a.m. to 10:05 a.m. which stores the integer 137, and a field from 10:05 a.m. to 10:10 a.m. which stores the integer 642, etc., for a polling interval of five minutes. Later on, the statistical record can be accessed to generate a histogram plotting disk accesses over time. From this, it is apparent that the maximum resolution of the histogram generated from this statistical record will be equal to the polling interval.

Once the change in the counter value has been stored in the statistical record, a determination is made as to whether the polling interval is to be reset (e.g., at the request of the network administrator), as indicated within a decision block 470. If it is determined that the polling interval is to be reset, then control of the method returns to the activity block 410 wherein the new polling interval is determined. If the polling interval is not to be reset, then the method returns to the decision block 420 wherein a determination is made if it is time to poll the device driver again. This method continues as long as the server is active.

Figure 5:
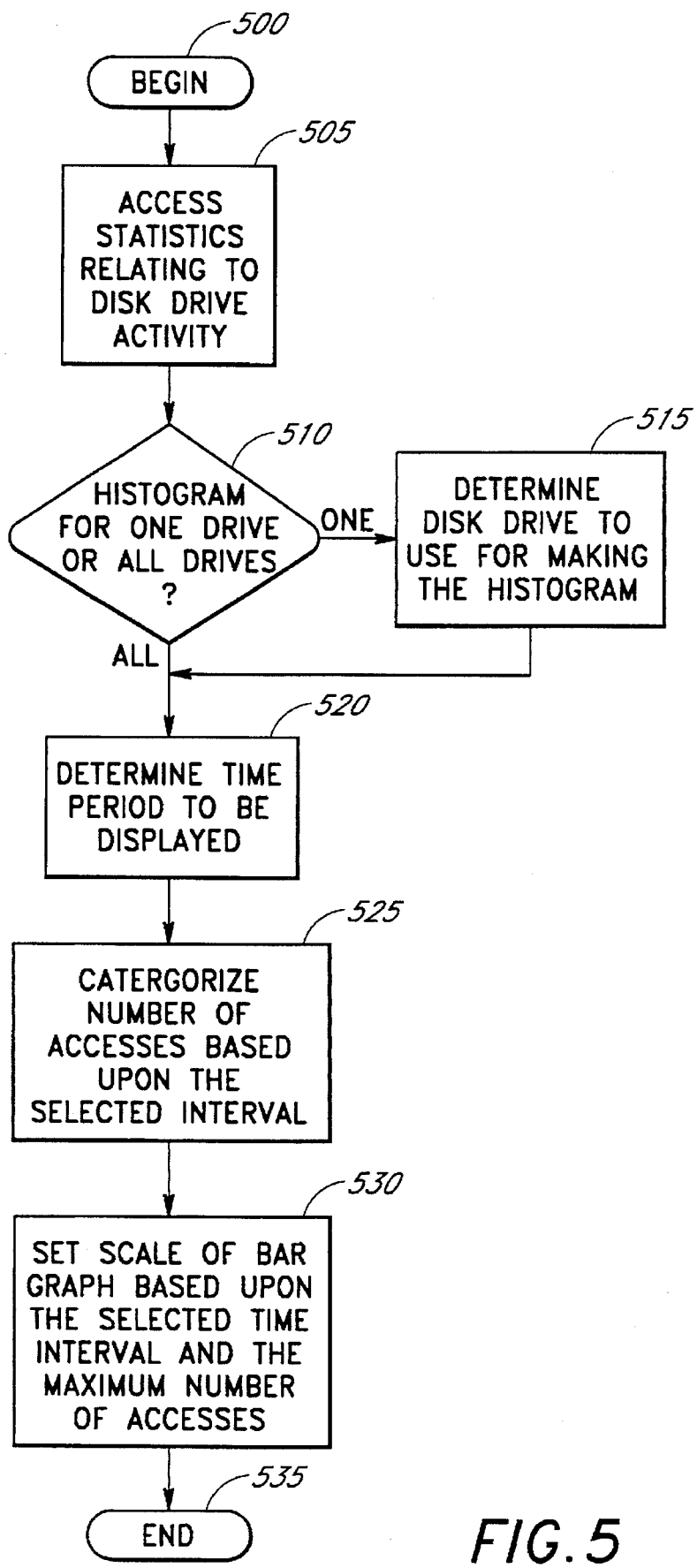
FIG. 5 is a flow chart which details the method of the generate histogram subroutine of FIG. 3 employed by the network server in accordance with the present invention.
Figure 6A:
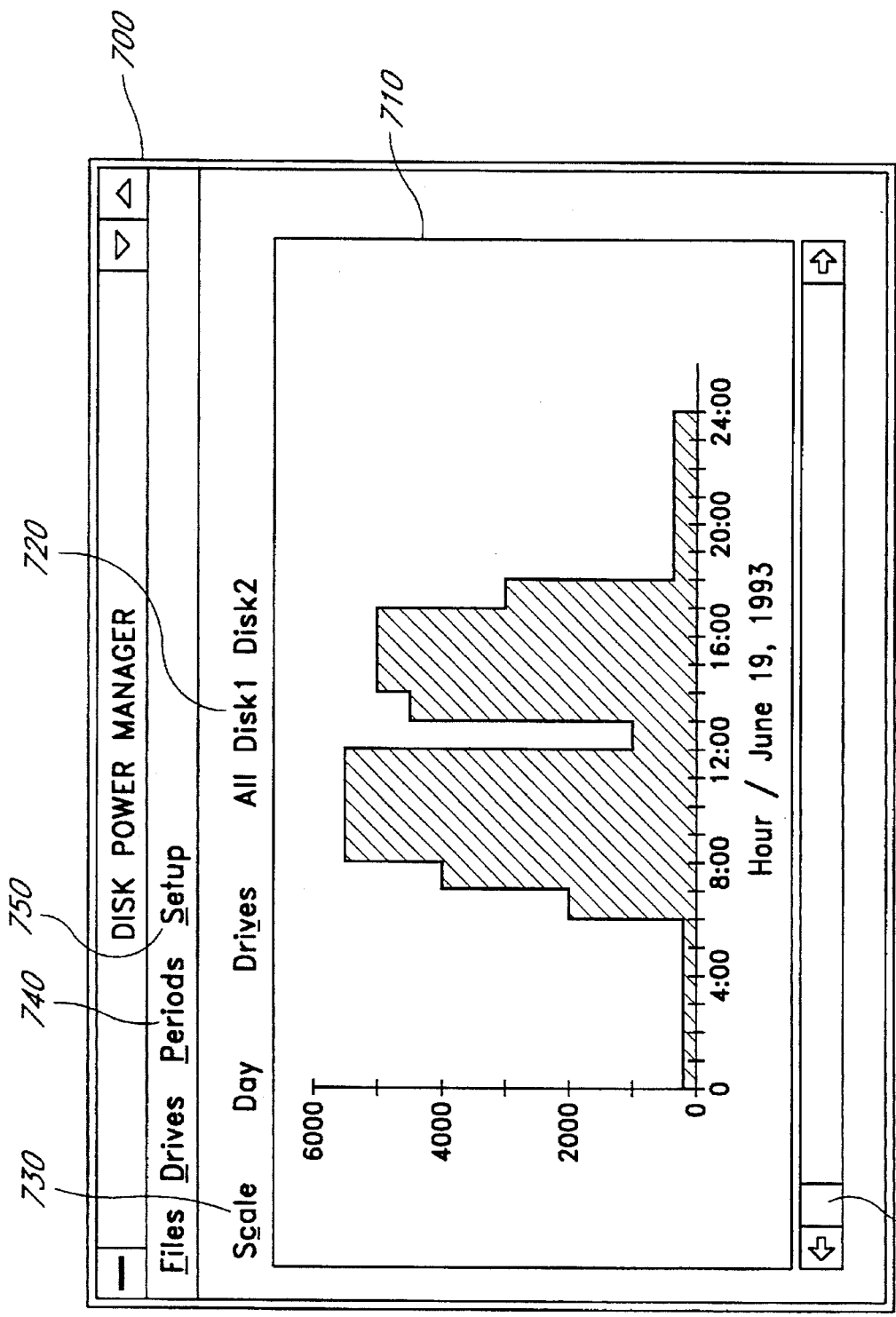
FIGS. 6A through 6D illustrate a plurality of exemplary MICROSOFT Windows/NT server screen displays which are presented to a user in order to facilitate the user's selection of a disk power management routine.

FIG. 5 is a flowchart which details the method used in accordance with the present invention to generate a histogram, as represented within the subroutine block 320 of FIG. 3. Specifically, the method initiates in a BEGIN block 500 and proceeds to an activity block 505, wherein the statistics relating to disk drive activity compiled within the monitoring subroutine 310 are accessed. Control passes from the activity block 505 to a decision block 510, wherein a determination is made as to whether a histogram is to be generated for one drive or for all of the drives within the disk subsystem 245. If the histogram is to be generated for disk accesses to all drives within the disk subsystem 245, then control passes immediately from the decision block 510 to an activity block 520. However, if, based on a user input selection, it is determined that the histogram is to be generated for a selected one of the disk drives within the disk subsystem 245, control passes to an activity block 515.

Within the activity block 515, the selected disk drive is determined, and the relevant statistics relating to the activity of that selected disk drive are compiled in order to generate the histogram for the selected disk drive. Control then passes to the activity block 520, wherein the time period over which the histogram is to be displayed is determined based upon the time period input by the network administrator. Once the selected time period is determined, control passes to an activity block 525, wherein the number of accesses to the selected disk drive or disk subsystem 245 is categorized based upon the selected time interval, as determined within the activity block 520. That is, because each of the disk accesses made to the disk subsystem 245 is associated with a polling interval (e.g., a five-minute interval of time) which generally designates the time of access, each disk access is included within the total number of disk accesses for a given time period (e.g., from 8:00 a.m. to 12:00 noon). Thus, for example, the network administrator may input selections which indicate that the histogram is to be generated over a 24-hour period divided into 1-hour intervals, as depicted in FIG. 6A. In this case, all disk accesses which are time stamped between 12:00 midnight and 1:00 a.m. will be included in the number of accesses represented by the bar depicted in the first 1-hour time interval, while the accesses time stamped between 1:00 a.m. and 2:00 a.m. will be included in the number represented by the bar depicted in the second 1-hour time interval, etc.

Once the number of accesses to the disk subsystem 245 is categorized, as represented in the activity block 525, control passes to an activity block 530, wherein the scale of the displayed bar graph representing the histogram is set based upon the selected time interval and the maximum number of accesses. That is, horizontal and vertical scales are determined so that the proportion of disk accesses is clearly displayed to the network administrator on a display screen. For example, if the maximum number of disk accesses during a defined time interval in the histogram is between 5,000 and 5,500, as depicted in exemplary FIG. 6A, then the maximum scale on the vertical axis should be set to approximately 6,000. Likewise, the horizontal scale, including the number of parts into which the selected time scale for the histogram is divided, is determined so that the histogram is displayed in a useful manner to the network administrator. Once the scale of the bar graph representing the statistical distribution of disk accesses is set within the activity block 530, the histogram is ready to be displayed on a display screen, and control passes to an END block 535.

FIG. 6A depicts an exemplary screen display of a histogram bar graph such as may be displayed to a network administrator to indicate the activity of the disks within the disk subsystem 245 of the network server 110. The screen display 700 includes a display field 710 which indicates the number of disk accesses to a selected disk drive over a selected time interval in histogram form. As shown in FIG. 6A, the display field 710 includes a vertical axis representing the number of disk accesses to the selected disk, or disks, as well as a horizontal axis representing the selected time interval over which accesses to the selected disk are tabulated. A drive select field 720 allows a user to select one of the disks within the disk subsystem 245 or to select monitoring for all of the disks within the disk subsystem 245.

A Scale field 730 allows the user to select a time scale over which the collected statistical data is to be displayed when the user clicks a mouse button while the mouse pointer is superimposed over the Scale field 730. Thus, for example, the user may select to monitor an hour, a day, a week, a month, and even a year of disk activity. Parameters, such as yearly disk activity, may be particularly helpful in failure analysis for predicting which disk drives are more likely to fail. As discussed above, such failure analysis information can be highly valuable to the network administrator, since the network administrator may redistribute certain data on disk drives to evenly distribute disk accesses so as to maximize the life of each of the disk drives within the disk subsystem 245.

Figure 6B:
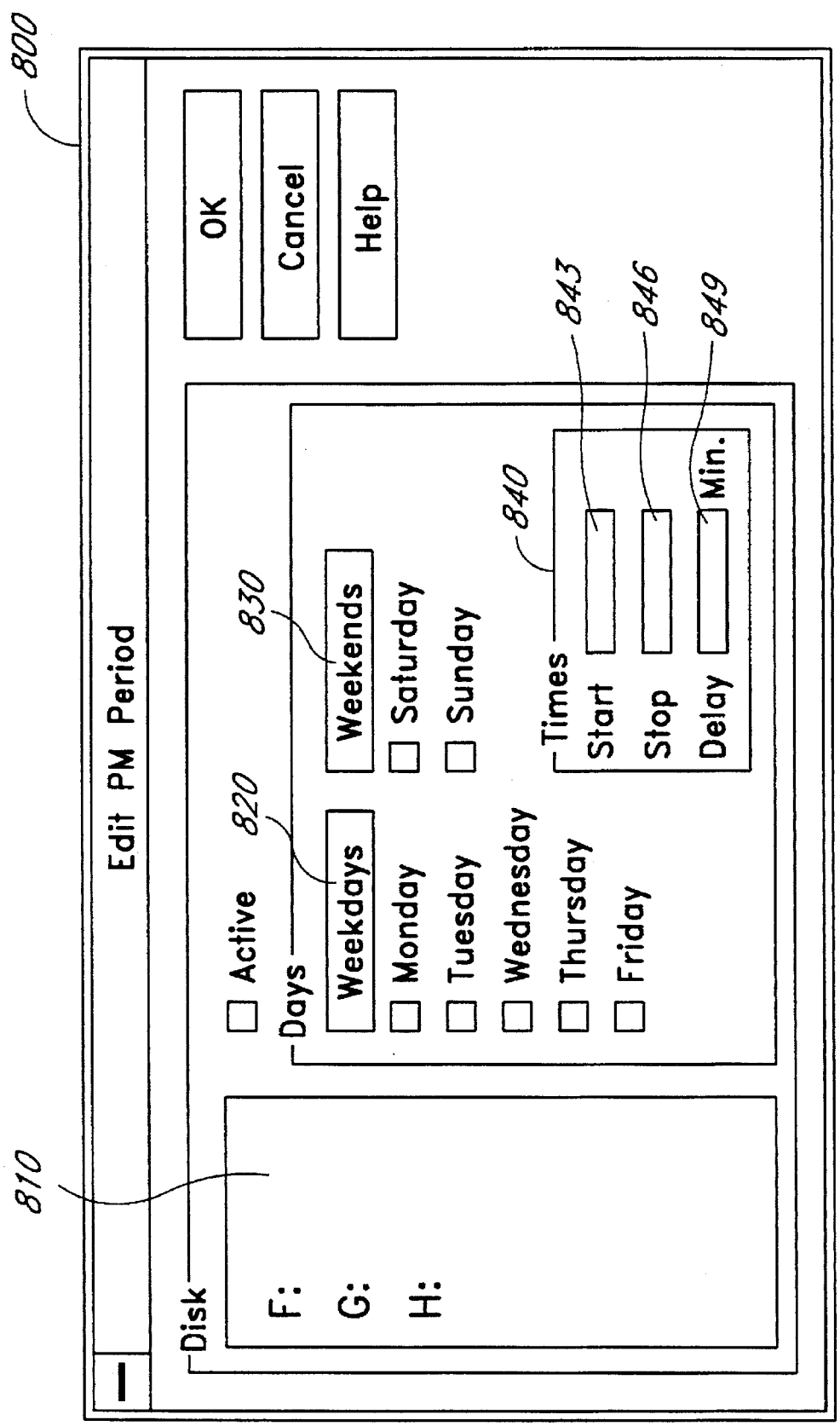

The display screen 700 further includes a Periods field 740 which allows the user to call up an "Edit PM Period" screen (FIG. 6B). The Edit PM Period screen allows the user to select the spin-up and spin-down times of each of the drives within the disk subsystem 245 for different times and days of the week.

Figure 6C:
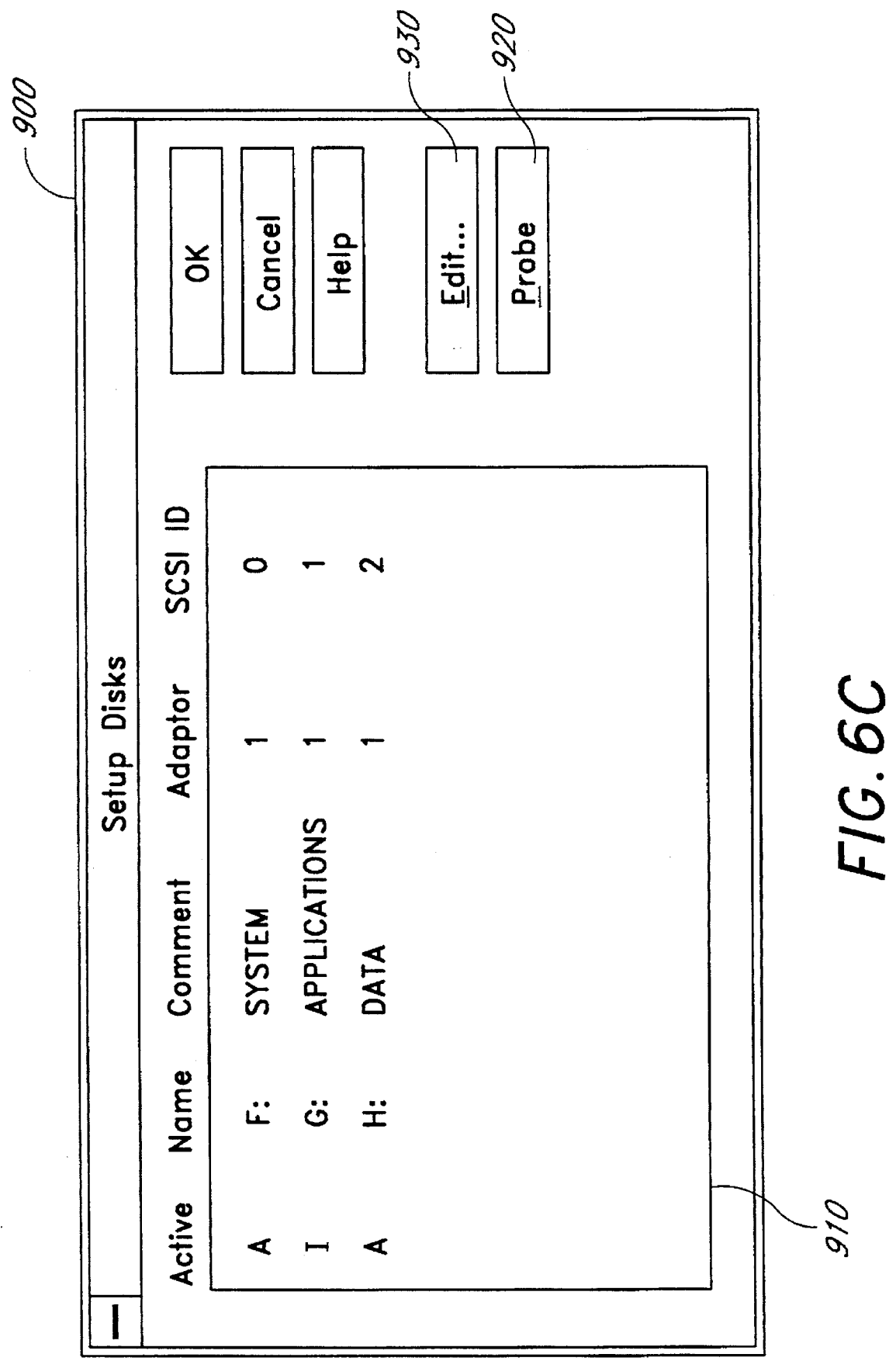

The display screen 700 further includes a Setup field 750 which allows the user to call up a setup screen (FIG. 6C). The setup screen allows the user to configure disk drives (e.g., assign identification numbers, etc.) based upon inputs by the network administrator.

Finally, the display screen 700 includes a scroll bar 760 which allows a user to move the time scale within the display field 710 to the left or to the right as the scroll bar 760 is dragged from left to right at the bottom of the display field 710.

FIG. 6B depicts a display screen 800 used by a network administrator to select the spin-up and spin-down times for each of the disk drives within the disk subsystem 245 of the network server 110. The display screen 800 includes a list box field 810 which lists the disk drive or drives by their assigned names, to be included in the selected spin-up and spin-down time intervals.

The screen display 800 further includes a Weekdays field 820 and a Weekends field 830. If the user selects the Weekdays field 820, then the selected time periods for spinning up or spinning down the disk drive will be applied to all the days within the week. Likewise, if a user selects the Weekends field 830, then the selected spin-up and spin-down times will apply to both Saturday and Sunday. Alternatively, the user may select individual days of the week by positioning the mouse pointer over the appropriate box and clicking the mouse button.

A Times field 840 includes a Start box 843, a Stop box 846, and a Delay box 849. To select the time at which the selected disk drive is to spin up, the user enters a time (e.g., in hours and minutes) within the Start box 843, while the spin-down time of the selected disk is designated in the same manner by typing in the appropriate time of day within the Stop box 846. The value entered into the Delay box 849 designates the time, in units of minutes, for which the selected disk drive will remain active when a memory access has been made to the disk drive during a designated spin-down interval. That is, if the selected disk is spun down during a given time period and a user on the network 100 logs on to access the disk drive during a designated spin down time interval, then the disk drive will automatically spin up (after a typical delay period of 10–15 seconds) and remain spinning until a time interval equal to the selected delay period is observed after the last disk access. In this manner, a user logged onto the network during off hours is enabled to interact efficiently with the network server 110 without having to wait for spin-up delays each time a disk is accessed. Rather, as long as the user is regularly accessing the disk drive, the network server 110 will operate in the same manner with the same performance as the network server would have during normal operating hours.

FIG. 6C depicts a display screen 900 used by the network administrator to set up disks within the disk subsystem 245 of the network server 110. That is, each of the disks within the disk subsystem 245 are assigned a name as well as a corresponding adapter and SCSI identification number. The set-up for each disk is displayed within a list box 910. The purpose of setting up the disks within the list box 910 is to identify the disk drives so that the user can select one disk drive as it is distinguished from another for spin-up and spin-down times. When the user selects a probe field 920, the list box 910 is filled with a list of the disk drives in a set of disk drives available on the system for control by the disk power manager of the present invention. As shown in the example of FIG. 6C, each disk drive includes a name, an active designation (whether power management is active for this drive), an adapter number, a SCSI I.D. number, and a corresponding comment. By selection of the edit box 930, the user is able to modify the name and comment entries within the list box 910.

Figure 6D:
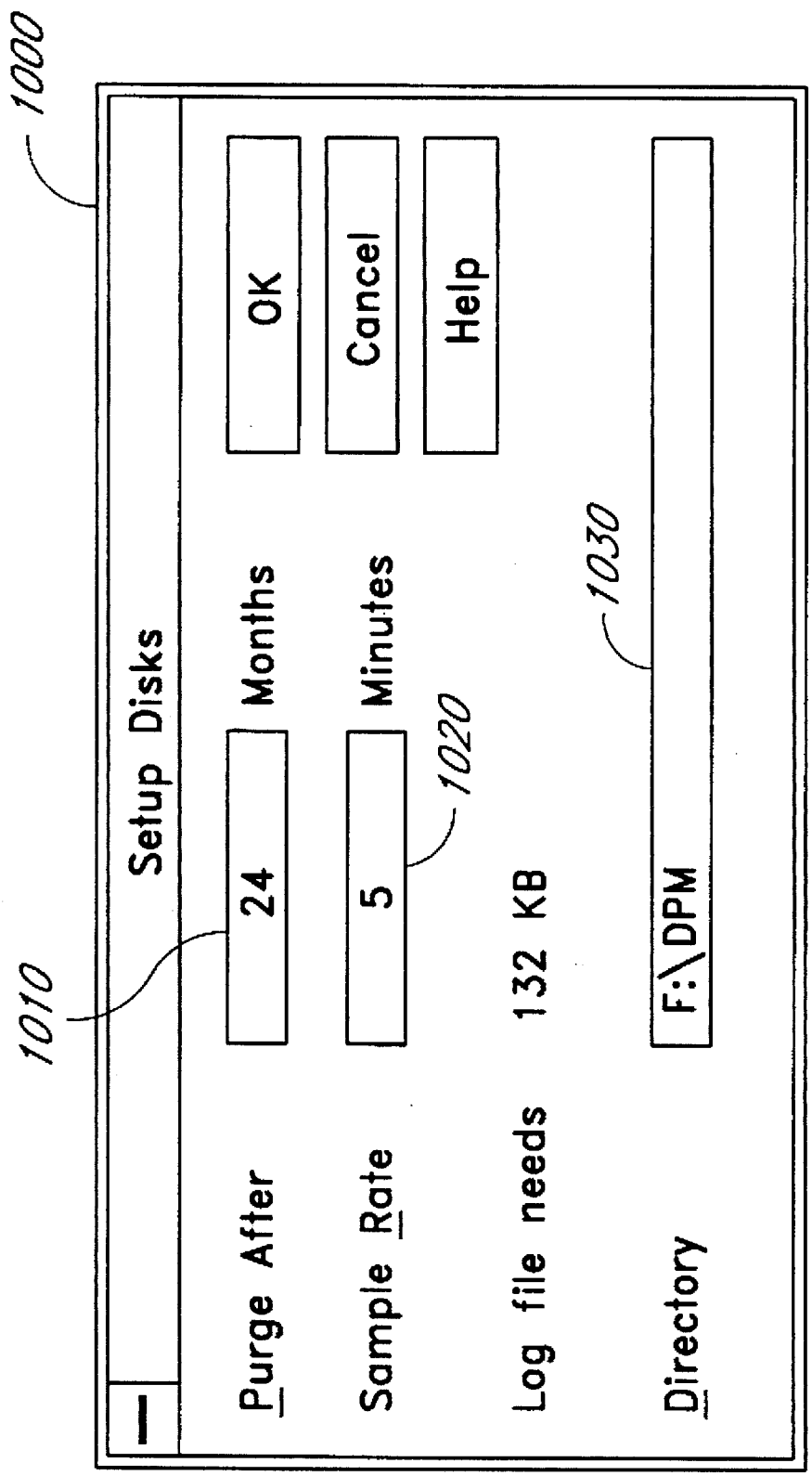

FIG. 6D depicts a display screen 1000 used by the network administrator to set up miscellaneous parameters applicable to all disk drives within the disk subsystem 245. The display screen 1000 includes a Purge After box 1010 wherein the network administrator enters the number of months over which statistical records of the number of disk accesses to the disk subsystem 245 are to be kept. Thus, for example, if 24 months are entered into the Purge After box 1010, all statistical data relating to disk accesses more than 24 months previously are discarded and are no longer available to be included within the histogram display provided to the network administrator.

A Sample Rate box 1020 is also provided to the network administrator to allow the network administrator to set the rate at which the disk access data is collected. As discussed above, the sample rate is also the minimum number of minutes of resolution for purposes of categorizing collected data. Thus, for example, if the network administrator enters five minutes into the box 1020, then the time intervals associated with each of the memory accesses will be indicated within an accuracy of five minutes from the actual time that the sample was taken.

Finally, the screen display 1000 includes a directory box 1030 which accepts a directory path name specifying the location of the disk activity log. As mentioned above, the disk activity log is a statistical record of the number of disk accesses made over time. This record is stored within the server and a new record is typically created each month. In the event that these statistical records are to be copied to a diskette for long term storage, it is important to know where the files are stored on the disk drive within the server.

FIGS. 6A–6D depict screen displays which are preferably implemented within a server operating with MICROSOFT WINDOWS/NT SERVER. However, it will be appreciated that other screen display formats could be implemented based upon the operating system which the server is using. For example, FIGS. 11A–11E are exemplary screen displays which are presented to a user on a server operating with NOVELL NETWARE in order to facilitate the user's selection of a disk power management routine. The screen displays depicted in FIGS. 11A–11E serve the same function as and generally correspond to the screen displays depicted in FIGS. 6A–6D. Specifically, the screen display 11A corresponds to the screen display 6A, the screen display 11B corresponds to the screen display 6B, the screen displays 11C and 11D correspond to the screen display 6C, and the screen display 11E corresponds to the screen display 6D.

Figure 7:
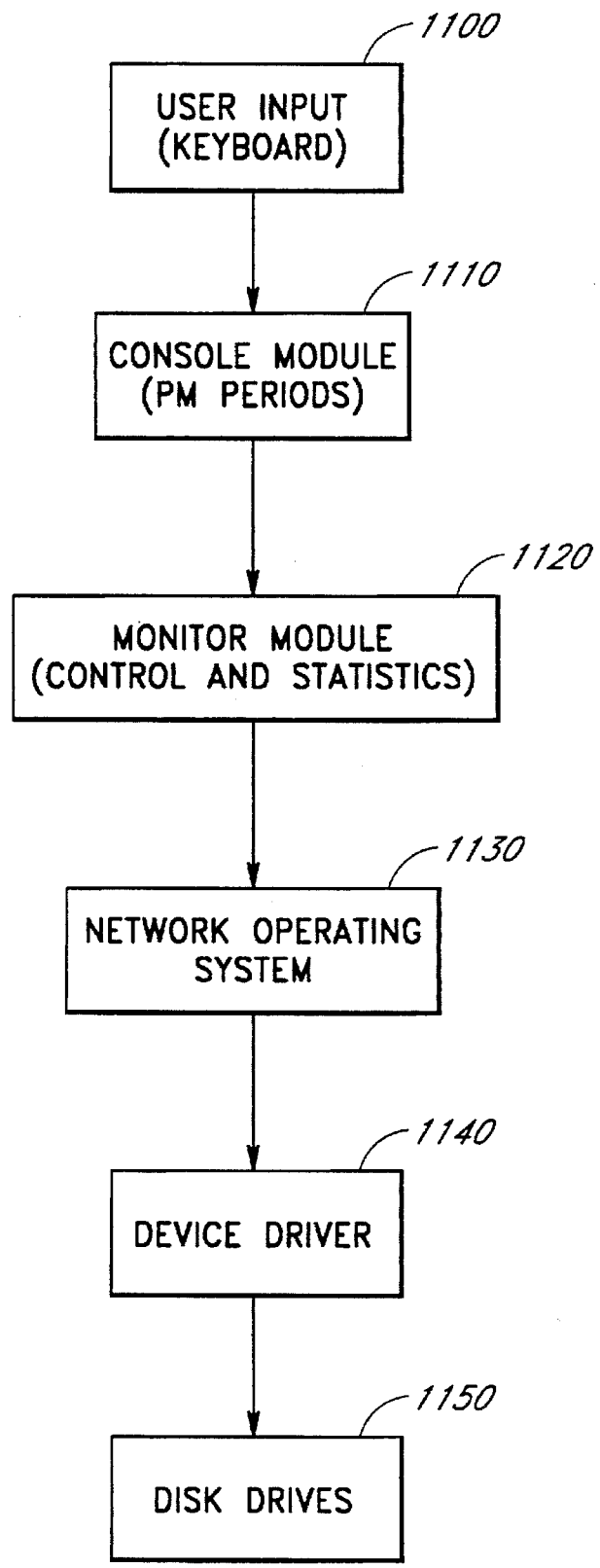
FIG. 7 is a network hierarchy diagram which depicts the several application layer modules used in accordance with the present invention.

FIG. 7 is an operational hierarchy diagram representing several layers of operation utilized within the network server 110 of the present invention. Specifically, a user input layer 1100 provides for user input via, for example, a keyboard or mouse input device.

A console module 1110 receives inputs from the user input layer 1100 and provides for management of the spin-up and spin-down periods of the disk drive within the disk subsystem 245. That is, within the console module 1110, data relating to the start and stop times associated with each disk drive, as well as the delay times associated with each disk drive and the days for which power management are applied, are stored as data.

A monitor module 1120 controls the monitoring of disk drive activity and is primarily responsible for gathering statistics relating to the number of accesses to each disk drive for a designated time period and within the designated time intervals.

The network operating system is represented as a layer 1130 and receives information derived from the user input layer 1100, the console module 1110, and the monitor module 1120 to control spin-up and spin-down of the disk drives represented within a layer 1150 via the device driver represented in a layer 1140. It should be noted here that, unlike notebook and desktop computers, the network operating system layer 1130 does not directly control the disk drive layer 1150. Rather, the network operating system layer 1130 is mediated via the device driver layer 1140 so that a custom device driver is required to directly control the spin-up and spin-down of the disk drives layer 1150.

Figure 8:
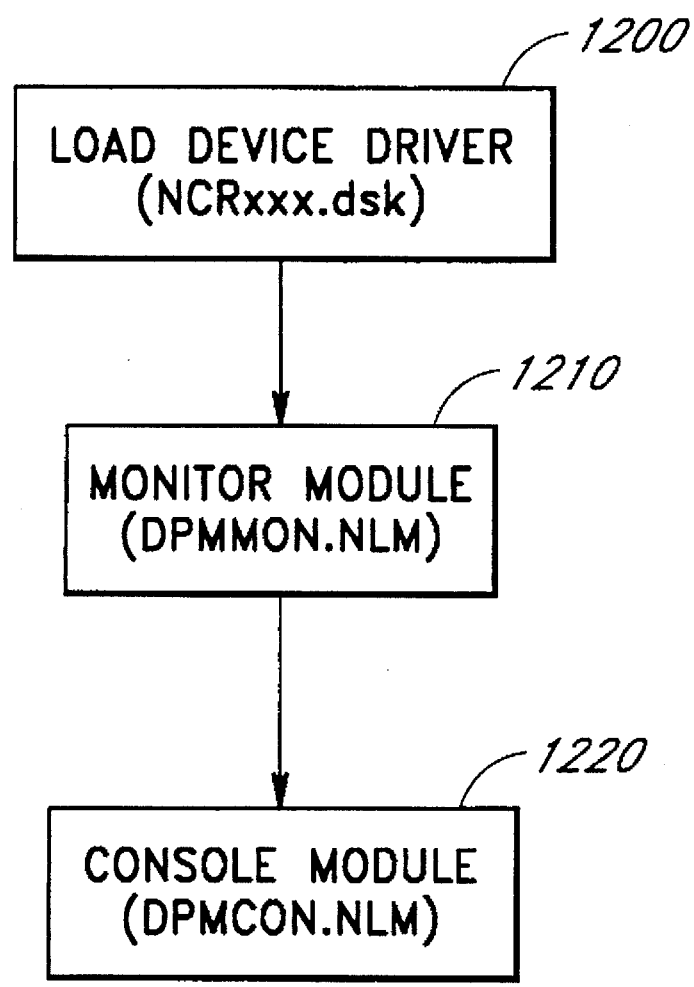
FIG. 8 is a flow chart which illustrates the order in which the application modules used in accordance with the present invention are loaded into the NOVELL network server.

FIG. 8 is a flow chart which represents the preferred loading order for the customized software modules used in accordance with the present invention when implemented on a NOVELL NETWARE server (e.g., the server 110). As depicted in FIG. 8, the device driver module 1140 (of FIG. 7) is first loaded as represented in an activity block 1200, subsequently, the monitor module 1120 (of FIG. 7) is loaded as represented within an activity block 1210. Finally, the console module layer 1110 (of FIG. 7) is loaded as represented within an activity block 1220.

Figure 9:
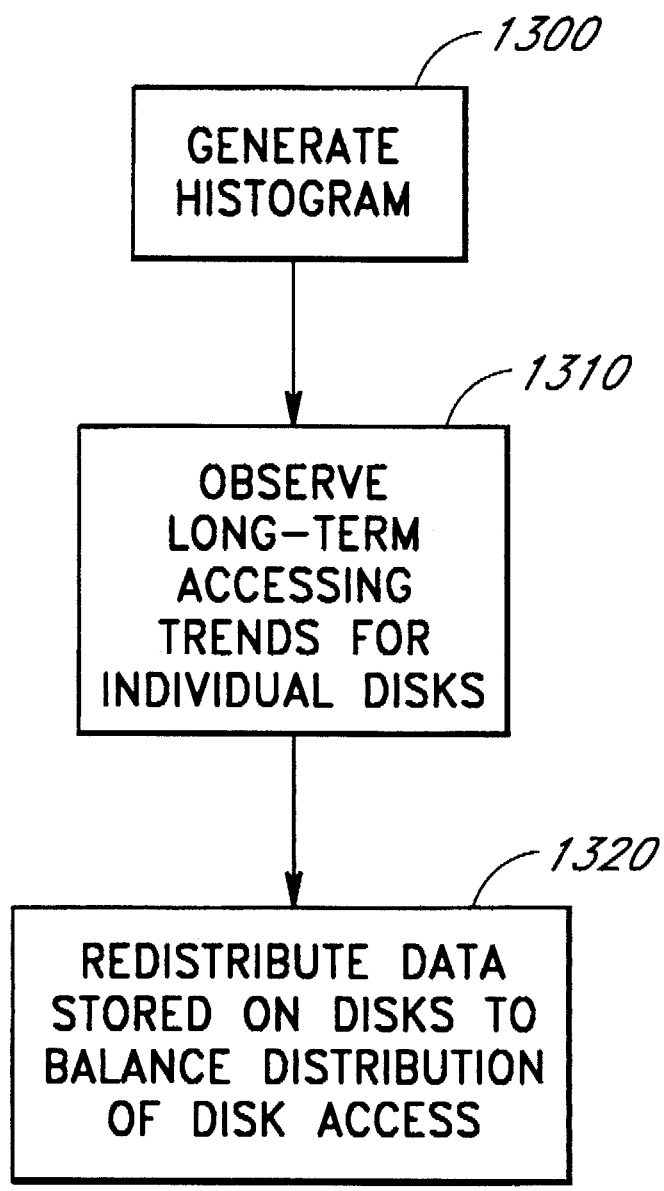
FIG. 9 is a flowchart which shows the overall method used to perform long-term failure analysis and to prevent premature failure of disk drives within the network server.

In accordance with a further aspect of the present invention, shown in FIG. 9, failure analysis can be performed using the histogram feature of the invention. In particular, once the histogram is generated, as indicated in an activity block 1300, the network administrator may observe long-term trends in accesses to individual disk drives 240, within the disk subsystem 245, as indicated within an activity block 1310. These long-term trends may indicate that certain disk drives are being accessed significantly more often than other disk drives. In order to reduce wear on the disk drives which are accessed more frequently, the network administrator may redistribute the information stored on the disk drives within the disk subsystem 245 so that information which is accessed more often is moved to disk drives with a history of fewer disk accesses. The redistribution of information stored on individual disk drives is represented in an activity block 1320 of FIG. 9. This causes accesses to the disk drives to be distributed more evenly so that any particular disk drive is less likely to fail over long-term use (i.e., because a disk drive is more likely to fail if the disk drive is accessed more often).

Figure 10:
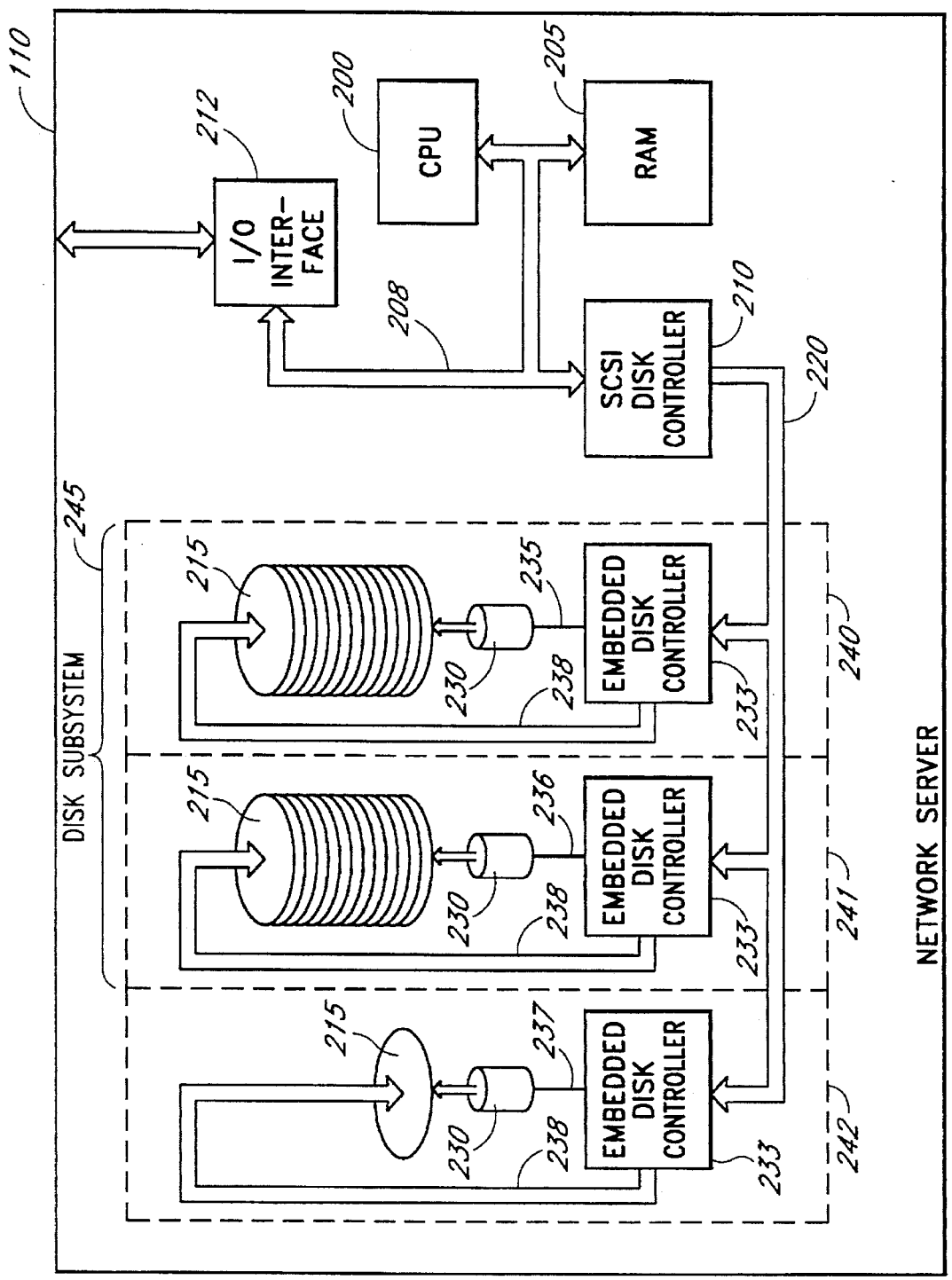
FIG. 10 depicts an embodiment of the network server which provides disk power management in systems which mandate regular accesses to disk drives during inactive periods.
Figure 11A:
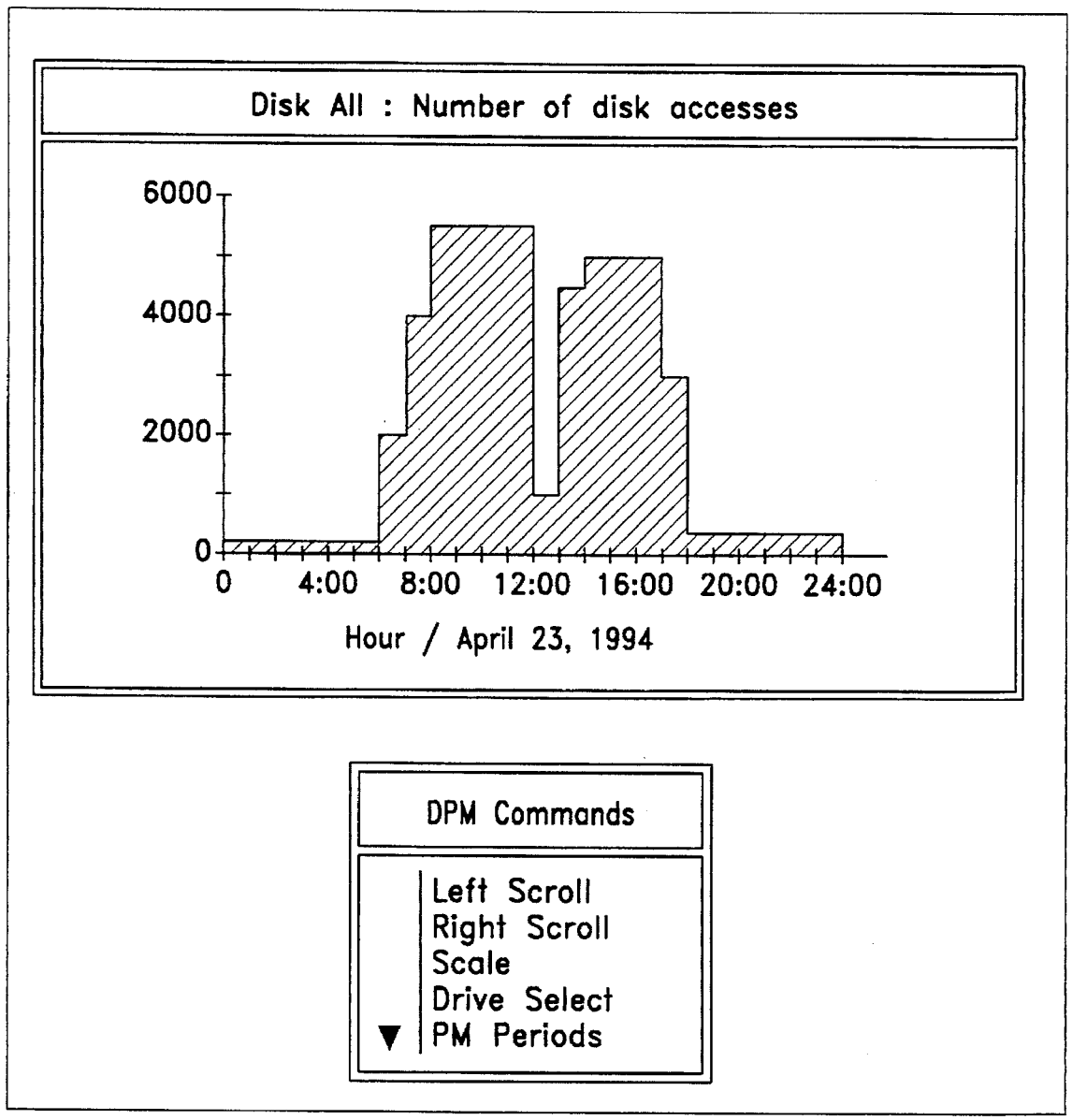
Figures 11B, 11C:
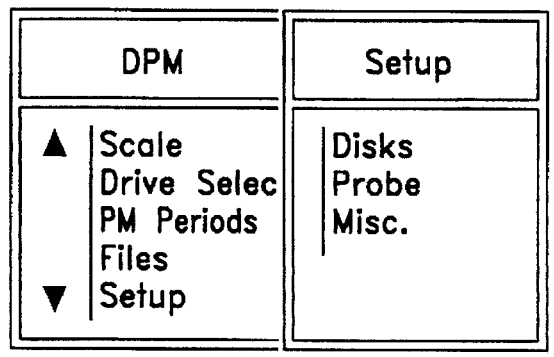

It should be noted here that, although the present invention can be implemented in network servers which are configured to run various network operating systems (e.g., NOVELL NETWARE), certain network operating systems require that accesses to the disk drives are made every few minutes, even while no users are logged onto the network. Thus, such systems may not derive the full advantages afforded by the disk power manager of the present invention. In one advantageous configuration, depicted in FIG. 10, the network server 110 is advantageously configured to include a small disk drive 242 separate from the other disks in the disk subsystem 245. The small disk drive 242 primarily contains data which are regularly accessed by the operating system, while the other disks in the disk subsystem 245 store data which are not accessed by the operating system during down-time (i.e., when no users are logged onto the network). Thus, only the small disk drive 242 is continuously spun-up, while the other disk drives are allowed to spin down at the designated intervals. Thus, the disk drives which are not accessed by the operating system can be spun-down to provide additional energy savings.

Although the preferred embodiment has been described and illustrated above, those skilled in the art will appreciate that various changes and obvious modifications do not depart from the spirit or essence of the invention. For example, alarm set points based upon the number of disk accesses (i.e., where an alarm sounds to alert the network administrator once a certain number of accesses has been exceeded) could be included within a preferred embodiment of the invention. Furthermore, alarm indications could be made using a "pop-up" error message screen, by sending an E-mail, or by activating a pager. In addition, the disk power manager could easily be adapted for use with redundant arrays of inexpensive disks (RAIDs). Accordingly, the scope of the present invention is limited only by the language of the following appended claims.

What is claimed is:

1. A computer network which provides for increased power efficiency during selected time intervals, said network comprising:

a plurality of user terminals;

a network server in communication with said plurality of user terminals to transmit data to said user terminals and to receive data from said user terminals, said network server comprising:

a processor which executes commands contained in a network operating system and an application module; and a plurality of data storage disk drives in communication with said processor, one or more of said disk drives being independently spun-down to conserve power for predetermined intervals in response to commands issued by said application module in response to commands issued by said network operating system executed by said processor, said predetermined intervals being chosen to correspond to time intervals when said one or more of said disk drives have a reduced probability of being accessed, thereby minimizing the impact on the operation of said network server.

2. A computer network as defined in claim 1, wherein said application module comprises a device driver.

3. A computer network as defined in claim 1, wherein said network server further includes a user input module which receives instructions from a user to determine time intervals over which said disk drives are to be spun-down.

4. A computer network as defined in claim 3, wherein said network server further comprises a monitoring module, executable by said processor, which monitors accesses to said disk drives to derive a statistical record therefrom, and a display terminal which displays data relating to said statistical record.

5. A network server which provides for increased power efficiency during selected time intervals, said network server comprising:

a processor which executes commands contained in a network operating system and an application module; and a plurality of data storage disk drives in communication with said processor, one or more of said disk drives being independently spun-down to conserve power for predetermined intervals in response to commands issued by said application module in response to commands issued by said network operating system executed by said processor, said predetermined intervals being chosen to correspond to time intervals when said one or more of said disk drives have a reduced probability of being accessed, thereby minimizing the impact on the operation of said network server.

6. A method of managing disk drive power within a network server having a processor which executes commands contained in a plurality of application modules, said network server having a plurality of disk drives responsive to said commands executed by said processor, said method comprising the steps of:

loading a device driver application module to be executed by said processor;

loading a monitoring application module to be executed by said processor;

loading a console application module to be executed by said processor;

monitoring accesses to each individual disk drive by said monitoring application module to generate a statistical record of said accesses for each individual disk drive;

inputting data relating to spin-up and spin-down of said disk drives via said console application module based upon said statistical record of said access to said disk drives; and controlling spin-ups and spin-downs of said disk drives to reduce power consumption of said disk drives via commands executed by said processor to said device driver module based upon said input data, said commands based upon the time of day and day of the week.

7. A method as defined in claim 6, wherein said inputting step, comprises inputting data relating to spin-up and spin-down of individual disk drives of said disk drive subsystem.

8. A method as defined in claim 6, wherein said controlling step, comprises controlling spin-up and spin-down of individual disk drives of said disk drive subsystem.

9. A method of managing disk drive power within a network server having a processor which executes commands, said network server having a plurality of disk drives responsive to said commands executed by said processor, said disk drives being accessible from a plurality of user terminals, said method comprising the steps of:

monitoring accesses to said disk drives;

tabulating a number of accesses to said disk drives within a selected time interval to establish a statistical record; and controlling power supplied to said disk drives in response to commands executed by said processor based upon said statistical record such that said disk drives are independently spun-up and spun-down without substantially affecting an availability of said disk drives having a statistically significant probability of being accessed by said network server at a point in time.

10. A method as defined in claim 9, wherein said monitoring step, monitors accesses to individual disk drives of said disk drive subsystem.

11. A method as defined in claim 9, wherein said controlling step comprises controlling power supplied to individual disk drives of said disk drive subsystem.

12. A method as defined in claim 9, wherein said controlling step, further comprises the steps of:

displaying information relating to said statistical record to a user;

inputting control parameters for determining time intervals over which said disk drives are to be spun-down based upon said displayed information; and spinning-down said disk drives at said determined time intervals in response to said commands executed by said processor.

13. A method as defined in claim 9, wherein said control parameters are selected to spin-down said disk drives during periods where said disk drives are statistically less likely to be accessed.

* * * * *